United States Patent [19]
Prunty et al.

[11] Patent Number: 6,091,231
[45] Date of Patent: Jul. 18, 2000

[54] ALTERNATOR ASSEMBLY

[75] Inventors: David Prunty; David Boivin; Michael Braun, all of Lomira, Wis.

[73] Assignee: R. E. Phelon Company, Inc., Aiken, S.C.

[21] Appl. No.: 08/878,892

[22] Filed: Jun. 19, 1997

[51] Int. Cl.⁷ .................................................. H02K 3/28
[52] U.S. Cl. ........................... 322/46; 310/181; 310/184; 322/29
[58] Field of Search .......................... 123/149 R, 149 D, 123/599; 310/179, 156, 181, 184, 185; 322/46, 29

[56] References Cited

U.S. PATENT DOCUMENTS

| | | | |
|---|---|---|---|
| 2,218,859 | 10/1940 | Schweitzer | 322/46 |
| 2,509,662 | 5/1950 | Wisman | 322/46 |
| 2,695,986 | 11/1954 | Gartner | 322/46 |
| 3,974,816 | 8/1976 | Henderson | 123/148 CC |
| 4,035,713 | 7/1977 | Kawamoto et al. | 322/28 |
| 4,163,187 | 7/1979 | Thomas | 322/79 |
| 4,221,983 | 9/1980 | Mourier | 310/72 |
| 4,454,465 | 6/1984 | Greene | 322/49 |
| 4,500,828 | 2/1985 | Nishihara | 322/46 |
| 4,628,891 | 12/1986 | Asai et al. | 310/156 |
| 4,766,362 | 8/1988 | Sadvary | 322/50 |
| 4,873,962 | 10/1989 | Safranek | 123/599 |
| 4,915,068 | 4/1990 | Tharman | 123/149 R |
| 5,031,587 | 7/1991 | Tharman | 123/149 R |
| 5,072,714 | 12/1991 | Bengtsson et al. | 123/601 |
| 5,747,909 | 5/1998 | Syverson et al. | 310/156 |
| 5,773,964 | 6/1998 | Peter | 322/20 |

*Primary Examiner*—Nestor Ramirez
*Assistant Examiner*—Burton Mullins
*Attorney, Agent, or Firm*—Nelson Mullins Riley & Scarborough, L.L.P.

[57] ABSTRACT

An electric current generation device includes a rotatable rotor including a magnet assembly establishing a magnetic field proximate the rotor. A stator includes at least one set of coils disposed with respect to the rotor so that rotation of the rotor moves the magnetic field with respect to the coils of the coil set to generate electric current flow in the coil set. The coil set includes an impedance component in communication with the electric current flow to limit the rate of increase of electric current flow generated by the coil set as the rotational speed of the rotor increases. The winding direction of at least one coil with respect to the magnetic field may be opposite the winding direction of the other coils with respect to the magnetic field. Two coil sets may be provided wherein the coils of a first coil set are wound so that the output of the first coil set is out of phase with respect of the output of a second coil set. A rectifier mechanism in operative communication with the first coil set and the second coil set rectifies and combines the output of the first coil set and the output of the second coil set.

40 Claims, 10 Drawing Sheets

ALTERNATOR ASSEMBLY

BACKGROUND OF THE INVENTION

The present invention relates to electric current generation devices. More particularly, the invention relates to improvements in stator construction for use in conjunction with a fly wheel providing a magnetic field to coils on the stator.

Small pull-start engines, such as are typically used in residential lawn mowers, generally include one or more spark plugs powered by an ignition mechanism in which current is generated by rotation of a magnet-carrying fly wheel. The fly wheel is integrally mounted to the crank shaft, which may be rotated by a pull cord. Thus, pulling the cord turns the crank shaft, thereby turning the fly wheel and activating the ignition mechanism. Thereafter, the motor drives the crank shaft so that the ignition continues to operate.

Smaller lawn mowers include a single rotary blade directly attached to the crank shaft. Although this requires the operator to overcome the inertia of the blade in rotating the crank shaft by the pull-cord to start the engine, the extra load is typically acceptable. Larger commercial mowers, however, may have multiple rotary blades driven by the crank shaft via belts extending from the shaft. The increased inertia caused by the multiple blades may make pull starting impractical. Thus, an electric clutch may be used to selectively engage the fly wheel to the loaded portion of the crank shaft. With the clutch disengaged, the fly wheel may be easily rotated by the pull-cord to start the engine. The clutch may then be engaged to turn the blades.

The clutch is an electric device run by DC current. To provide this current, the fly wheel is constructed in an alternator configuration. Typically, the fly wheel includes an inner diameter having magnets disposed thereabout. A stator concentric with the fly wheel rotor includes a series of windings, or coils. The rotor rotates at engine speed and provides a moving magnetic field which causes current flow in the windings.

Accordingly, the stator output current depends on engine speed. That is, when the engine is running at low rpm's, the fly wheel is rotating slowly, and the current output is relatively low. As engine speed increases, however, so does the alternator current output.

If the alternator output is too low at low engine speed, the clutch will not engage, and the mower is not operable. One way to resolve this problem is to increase alternator output at low rpm's. This may be done in various ways. Unfortunately, increasing current output at low rpm's in conventional systems also increases the output at high rpm's. If the current output is too high, the clutch may fail.

SUMMARY OF THE INVENTION

The present invention recognizes and addresses the foregoing disadvantages, and others, of prior art constructions and methods.

Accordingly, it is an object of the present invention to provide an improved electric current generation device.

More particularly, it is an object of the present invention to provide an improved alternator assembly exhibiting an output current profile such that downstream devices are operable as engine speed increases through the engine's operative speed range.

It is a still further object of the present invention to provide an improved alternator assembly having a rectified output signal.

Some of these objects are achieved by an electric current generation device comprising a rotatable rotor including a magnet assembly establishing a magnetic field proximate the rotor. A stator includes at least one set of coils disposed with respect to the rotor so that rotation of the rotor moves the magnetic field with respect to the coils of the coil set to generate electric current flow in the coil set. The coil set includes an impedance component in communication with the electric current flow to limit the rate of increase of electric current flow generated by the coil set as the rotational speed of the rotor increases.

In a preferred embodiment, the rotor has an inner annular surface and includes a plurality of magnets arranged in a spaced apart relationship and in alternating polarity about the inner annular surface to establish the magnetic field.

The stator has an annular outer surface concentric with and opposing the rotor inner annular surface and includes a plurality of poles extending from the annular outer surface. Each coil of the coil set is wound about a pole and is connected in series with its adjacent coil(s). A plurality of adjacent coils within the set are wound in alternating opposite directions with respect to each other so that the coils of this first coil group are electrically in phase with each other. The remaining coil or coils comprise a second coil group and are wound in an opposite direction to the first group with respect to the magnetic field so that the second group is electrically out of phase with the first group.

In another preferred embodiment, the stator includes at least two coil sets disposed with respect to the rotor so that rotation of the rotor moves the magnetic field with respect to the coils of the coil sets to generate electric current flow in the coil sets. The coils of a first coil set are wound so that the output of the first set is out of phase with respect to the output of a second coil set. A rectifier mechanism is in operative communication with the first coil set and the second coil set to rectify and combine the output of the first coil set and the second coil set.

The accompanying drawings, which are incorporated and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
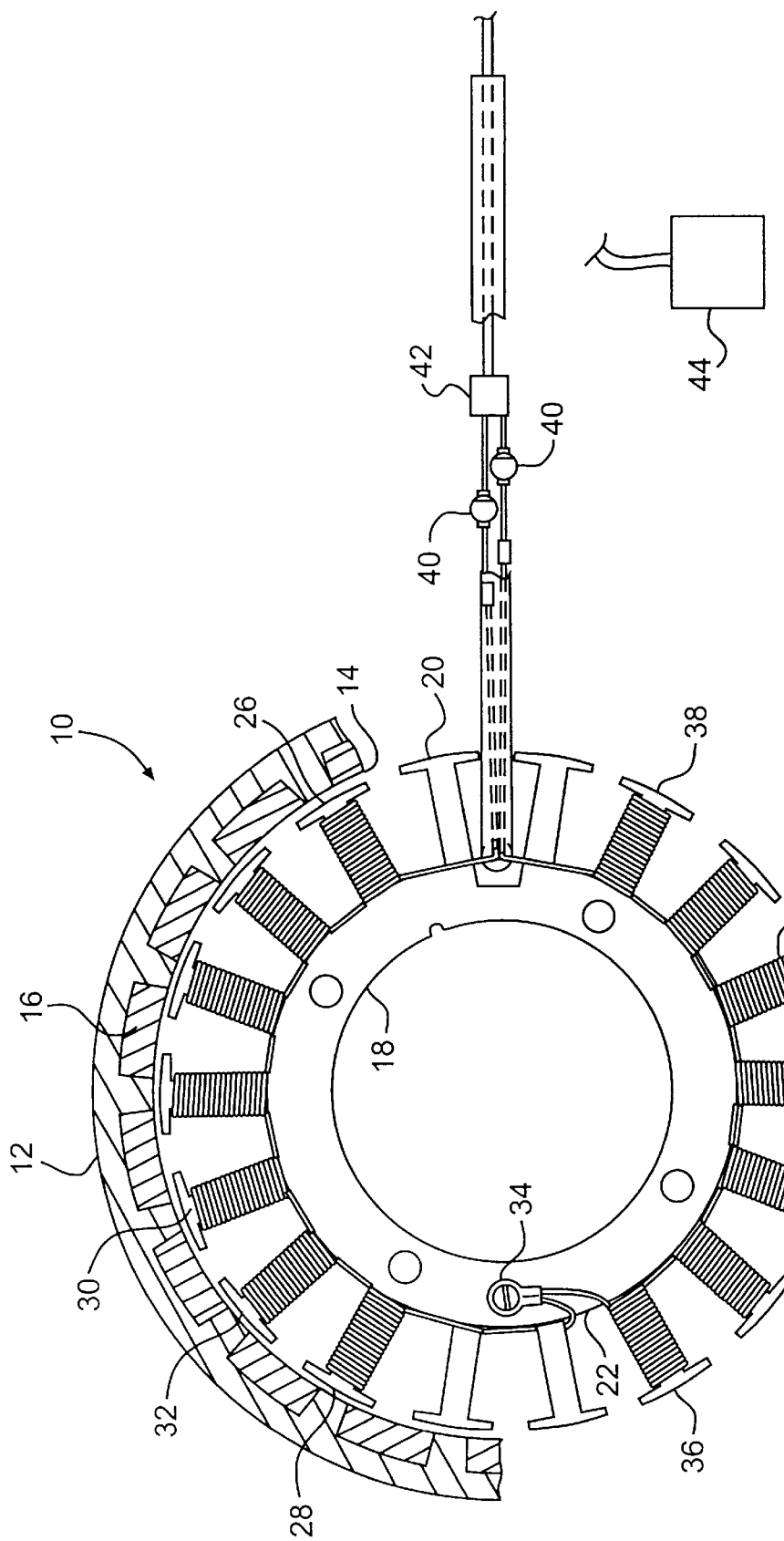
FIG. 1 is a partial schematic illustration of an electric current generation device constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved electric current generation device. Accordingly, FIG. 1 depicts a presently preferred embodiment of an alternator, shown generally at 10. A rotor 12 is part of a fly wheel connected to a crank shaft (not shown). Rotor 12 has an inner annular surface 14 and includes a plurality of magnets 16 arranged about inner diameter 14 in alternating polarity. That is, if one of the magnets 16 is arranged so that its positive pole is exposed at annular surface 14, the two magnets 16 adjacent to and on either side of the first magnet are arranged so that their negative poles are exposed at inner annular surface 14. In a preferred embodiment, the rotor includes six magnets, each having three poles in alternating polarity. Thus, eighteen poles, alternatingly positive and negative, are presented at the rotor's inner diameter. As described herein, this arrangement is considered to be eighteen magnets arranged in spaced apart relationship and in alternating polarity. It should be understood, however, that eighteen discrete magnets could be used.

Stator 18 employs a lamination stack with eighteen poles 20 extending from an outer annular surface 22. A plastic insulating tray is used to electrically isolate the copper windings, or coils, 24 from the steel laminations. The rotor rotates at engine speed and provides the magnetic flux reversals which cause current flow in the windings.

Assuming that the rotor illustrated in FIG. 1 includes eighteen magnets with the same angular spacing as poles 20, magnets 16 periodically align with the poles as the rotor rotates. When the magnets radially align with the poles, the magnets radially opposite any two adjacent poles are of opposite polarity. This is an example of magnets arranged in alternating polarity with respect to the coils. As should be understood by those of ordinary skill in the art, however, various suitable magnet arrangements may be used. For example, one or more of the magnets 16 may be eliminated, leaving a number less than eighteen. Although the two magnets on either side of a gap created by a missing magnet have the same polarity, the magnet pattern of alternating polarity remains, and the rotor magnets are still considered to be arranged in alternating polarity, in this case with respect to the coils.

A first winding set includes the seven coils wound about the poles on the upper half of stator 18. These coils include forty-eight turns per pole of #22 AWG copper wire. Those of ordinary skill in this art should understand that the number of windings, and their construction, may depend on the use to which the alternator is to be put, the conditions under which it is to be operated, and other possible factors. Thus, the above-described dimensions are provided for illustrative purposes only and are not intended to limit the scope of the present invention.

Beginning with pole 26 and moving counterclockwise to pole 28, the respective winding direction of each coil 24 is clockwise, counter clockwise, clockwise, counter clockwise, clockwise, clockwise and counter clockwise. That is, a first group of these coils, extending in the counter clockwise direction along stator 18 from pole 26 to pole 30, includes coils wound in alternating opposite directions with respect to each other. Because the permanent magnets 16 exhibit alternating polarity, however, these coils are electrically in phase with respect to each other. That is, the responses of these coils with respect to the magnetic field generated by the moving rotor magnets are in phase with each other.

A second group of coils within the first coil set includes the coils wound about poles 32 and 28. These poles are also wound in alternating opposite directions but break the pattern of the first group. With respect to the magnetic field, the winding direction of the coils of the second group is opposite to the winding direction of the coils in the first group. The coils of the second group are electrically out of phase with respect to the coils of the first group.

The coils of the first coil set are connected in series and are grounded to stator 18 at 34. Stator 18 is connected to the engine block.

The reverse winding of the two "reverse wound" coils limits current from the five "forward wound" coils by reducing the voltage across the coil set and by increasing the coil set's impedance. That is, the reverse wound coils limit the current from what it would have been had the coil set consisted of the forward wound coils alone. Often, the resulting current is less than what it would have been had the coil set been comprised solely of a number of forward wound coils equal to the difference between the number of forward wound coils and the number of reverse wound coils in the actual coil set. The reverse wound coils are designed with sufficient inductance to oppose high-speed current without negatively affecting low speed performance.

A second coil set, beginning at pole 36 and extending counter clockwise to pole 38, is wound similarly to the first coil set. Beginning at pole 36, winding directions are counter clockwise, clockwise, counter clockwise, clockwise, counter clockwise, counter clockwise and clockwise. Given the orientation of the first and second coil sets with respect to the moving magnetic field and between ground 34 and the stator output at diodes 40, the winding direction of the coils of the coil sets causes the output the coil sets to be out of phase. Specifically, with respect to the magnetic field generated by the permanent magnets 16, the winding direction of the coils of the first coil set is opposite to the winding direction of the coils of the second coil set. As described in more detail below, this causes the output of the first coil set to be 180° out of phase with respect to the output of the second coil set.

The output of each coil set is electrically connected to a respective diode 40. Rectifier 40 adds a DC component to the output of the coil sets. As used herein, a rectifier is a mechanism which adds a DC component to an AC signal. The diode outputs are spliced at 42. The output of connection 42 is connected to a powered device, such as electric clutch 44, for example through a manual switch and/or safety switches (not shown).

Although the output of the stator 18 is described as powering an electric clutch, it should be understood that device 44 may include or consist of other devices, for example an ignition mechanism, fuel pump, fuel injector or head light.

Figure 2:
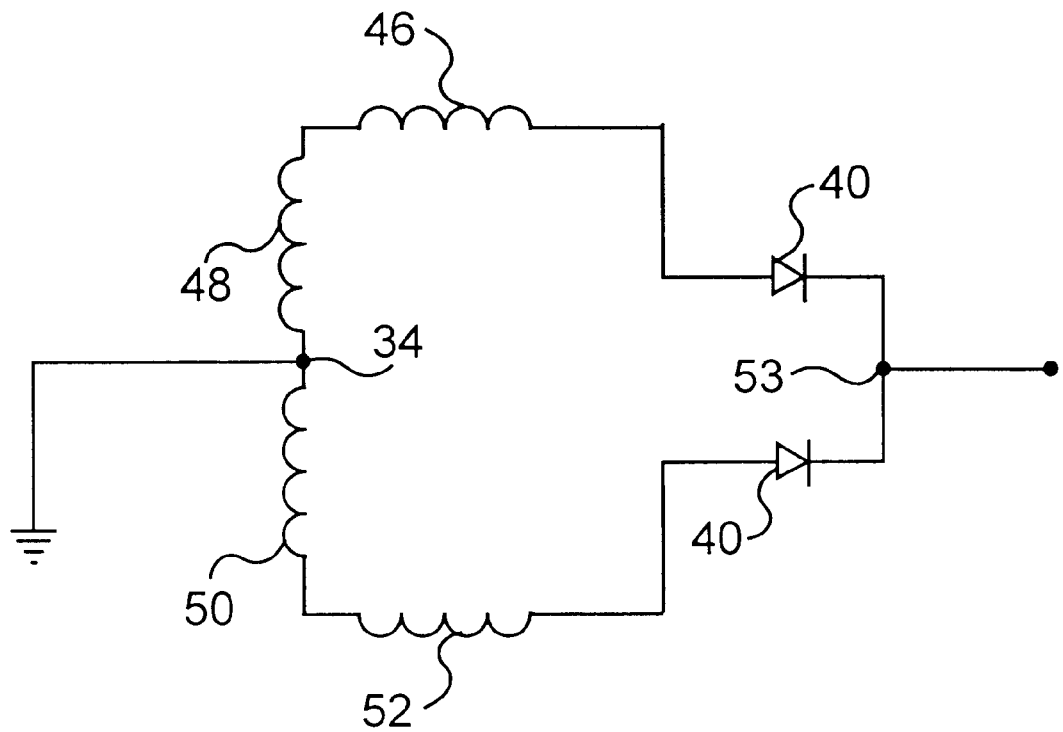
FIG. 2 is an electric diagrammatic representation of a stator of an electric current generation device constructed in accordance with the present invention.

FIG. 2 provides an electric schematic illustration of stator 18. The first coil group (the windings from poles 26–30) of the first set are represented by coil 46. The second group (the windings on poles 32 and 28) is represented by coil 48. The first group (the windings on poles 36–24) of the second coil set are represented by coil 50, and the second coil group (the windings on pole 38 and the adjacent pole) is represented by coil 52. Diodes 40 are connected between the output of coils 46 and 52, respectively, and connection 53. In another preferred embodiment, however, diodes 40 are connected, in the same biasing direction as illustrated in FIG. 2, between the coils on poles 48 and 50, respectively, and ground. Thus, referring to FIG. 1, one diode 40 may be connected between the coil on pole 36 and ground connection 34, while the other diode is connected between the coil on pole 28 and ground connection 34. The diodes in this arrangement half-wave rectify the output of their respective coil sets. Connection 53 (FIG. 2), which should be understood to be part of the rectifier mechanism of this embodiment, combines the output of the coil sets. Moreover, any suitable arrangement of the diodes, or other rectifying mechanism, with one or more of the coil sets should be understood to be within the scope and spirit of the present invention.

Figure 3:
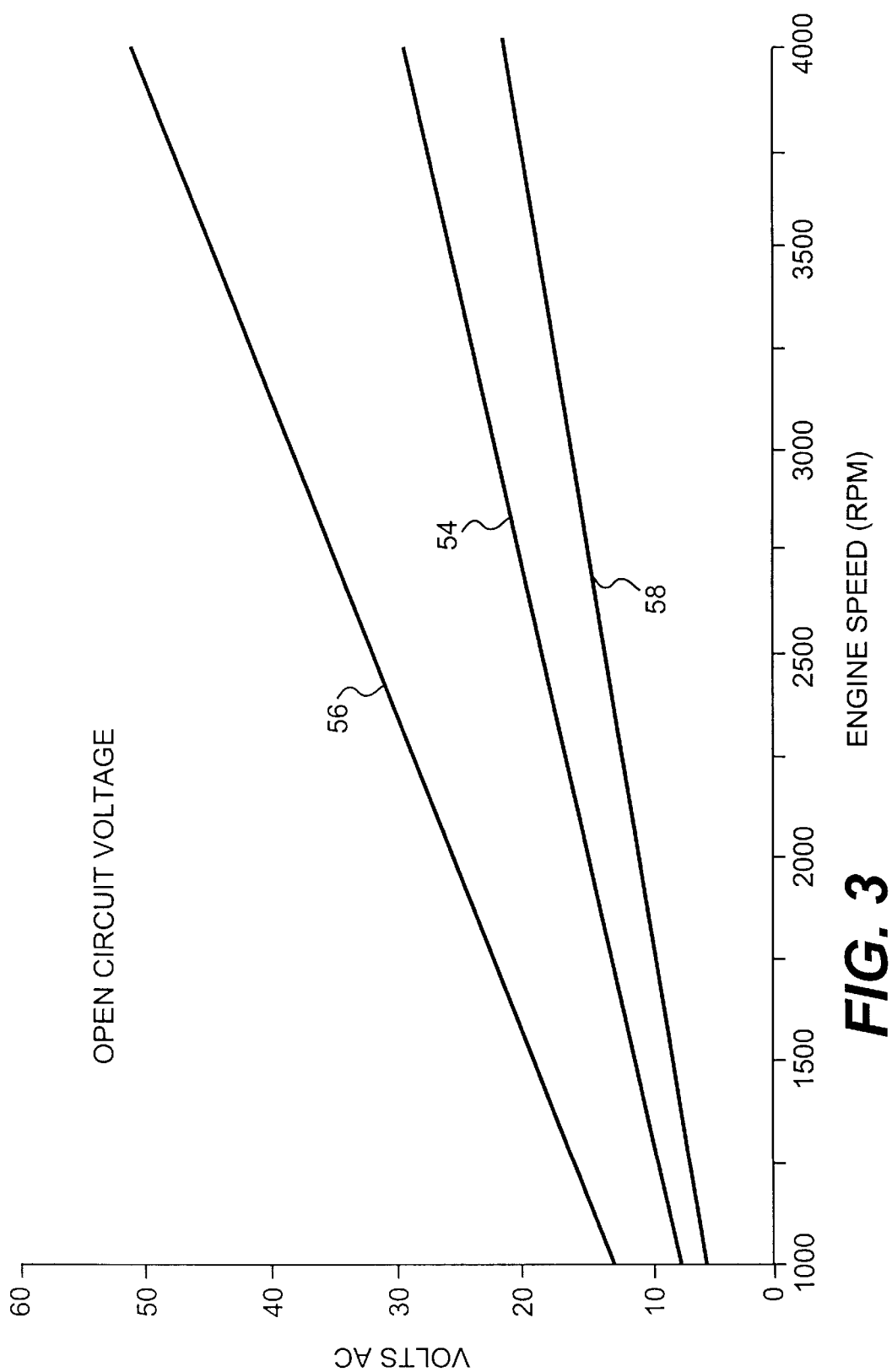
FIG. 3 is a graphical representation of voltage output of an electric current generation device constructed in accordance with the present invention compared to reference voltage outputs.

FIG. 3, at line 54, describes the AC voltage output of one of the coil sets of stator 18 (FIG. 1) as a function of engine speed. Line 56 describes the AC voltage output of the five forward wound coils of the first coil group alone. Line 58 describes the AC voltage output of two forward wound coils alone. As can be seen from the graph, the effect of the two reverse wound coils of the second coil group on the total coil set output is approximately equal to the aggregate voltage across the five forward wound coils less the aggregate voltage across two coils.

Figure 4:
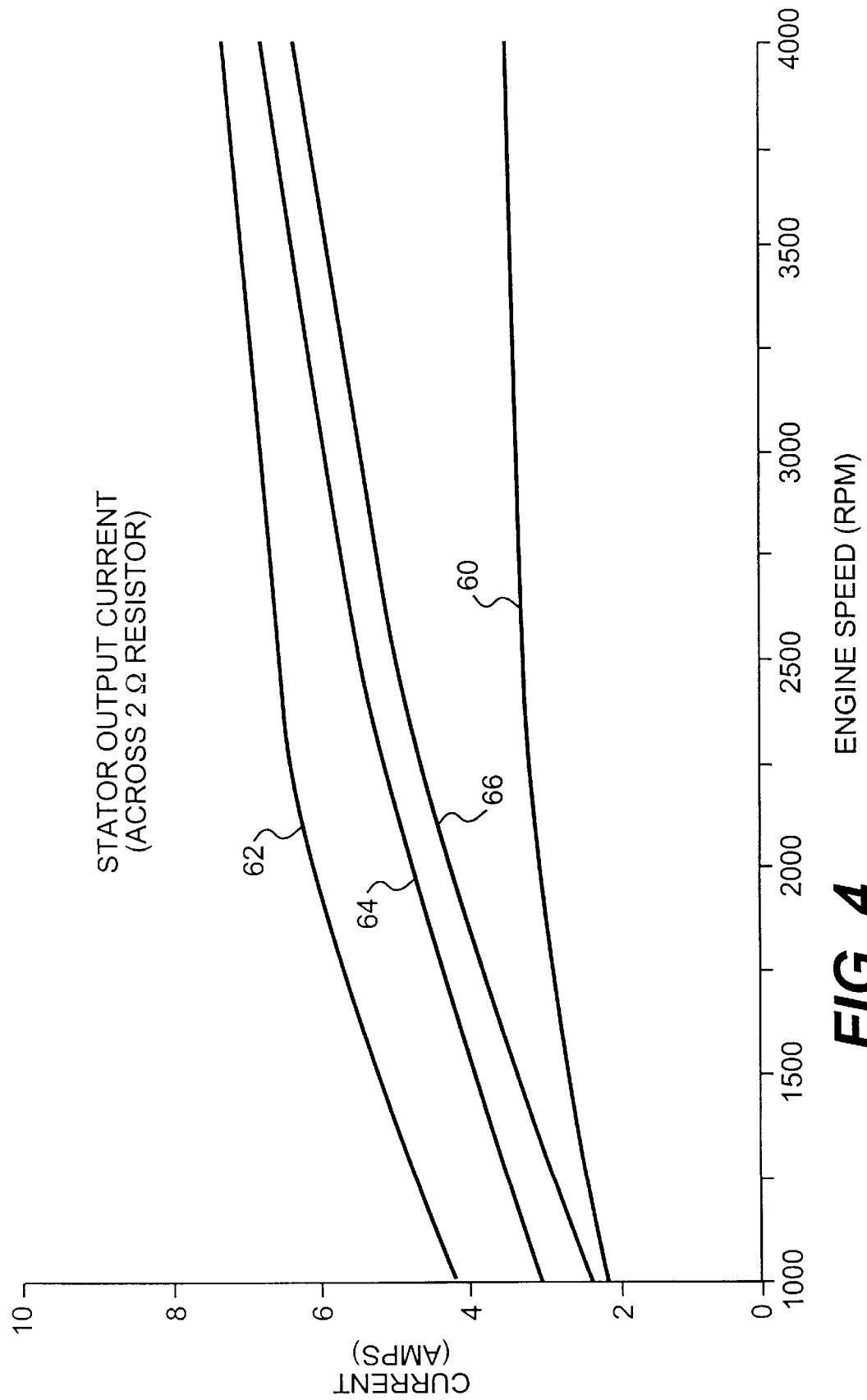
FIG. 4 is a graphical representation of electric current output of an electric current generation device constructed in accordance with the present invention compared to reference current outputs.

FIG. 4, at line 60, illustrates the electric current output of one of the coil sets shown in FIG. 1 across a 2 ohm resistor. Line 62 illustrates the current output of the five forward wound coils of the first group alone. Line 64 illustrates the current output of three forward wound coils alone, and line 66 illustrates the current output of two forward wound coils alone.

As can be seen from FIG. 4, the profile of the current output of the total coil set (line 60) is much flatter than the output profile of the other coil combinations. Assuming that the current output of the coil set at 1000 rpm's is sufficient to activate a device such as an electric clutch, the output current increase over the illustrated engine speed range is relatively low. Thus, the coil set can provide current at low engine speeds sufficient to activate the electric clutch without danger of providing too much current at higher engine speed.

In contrast, the construction illustrated by lines 64 and 66, while apparently providing sufficient and safe current at low engine speeds, may provide excessive current at higher engine speeds. The construction illustrated by line 62 may provide excessive current relatively early in the engine speed range.

Figure 5:
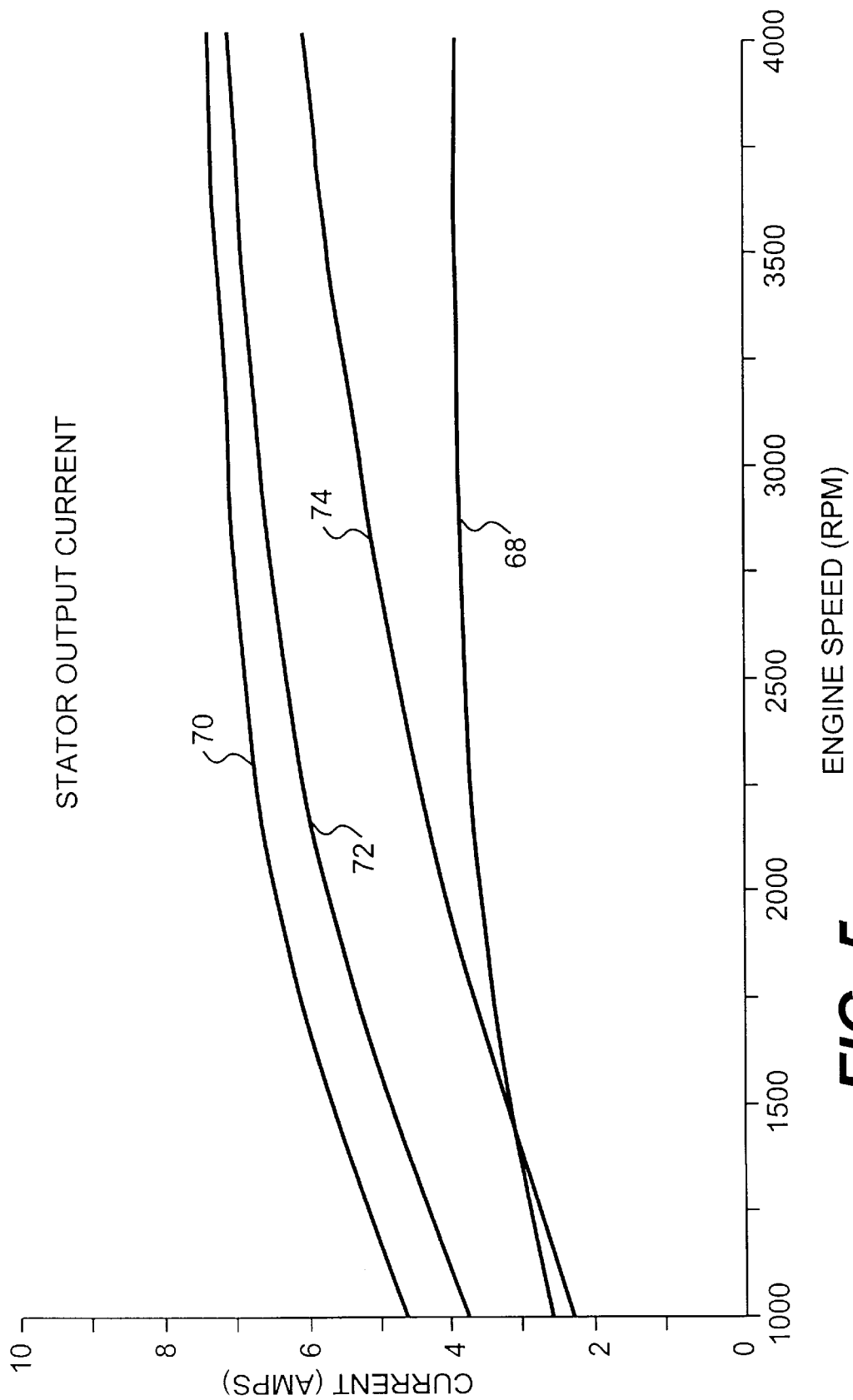
FIG. 5 is a graphical representation of electric current output of an electric current generation device constructed in accordance with the present invention compared to reference current outputs.

In another preferred embodiment, each coil set includes a first coil group with six forward wound poles and a second group of two reverse wound poles. The current output of this configuration is illustrated in FIG. 5. Line 68 illustrates the current output of one coil set constructed in such a manner. Line 70 illustrates the current output of six forward wound poles alone. Line 72 illustrates the current output of four forward wound poles alone, and line 74 illustrates the output of two forward wound poles alone. Again, current is measured where the coil set output is shorted across a two ohm resistor.

Figure 6A:
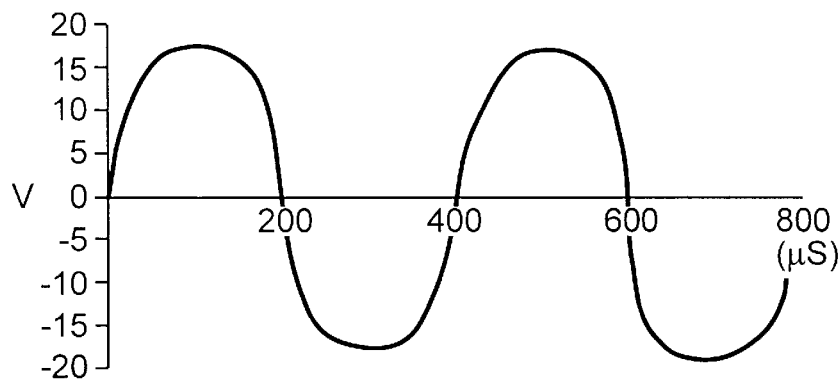
FIG. 6A is a graphical representation of an unrectified AC voltage output signal from one coil set of an electric current generation device constructed in accordance with the present invention.
Figure 6B:
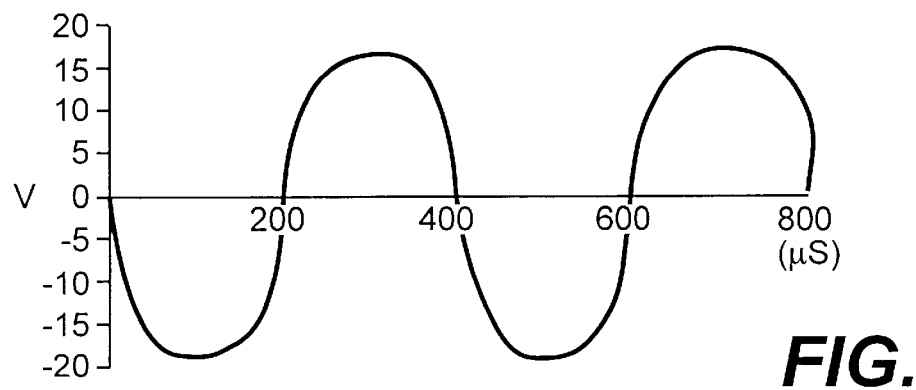
FIG. 6B is a graphical representation of an unrectified voltage output signal of one coil set of an electric current generation device constructed in accordance with the present invention.
Figure 6C:
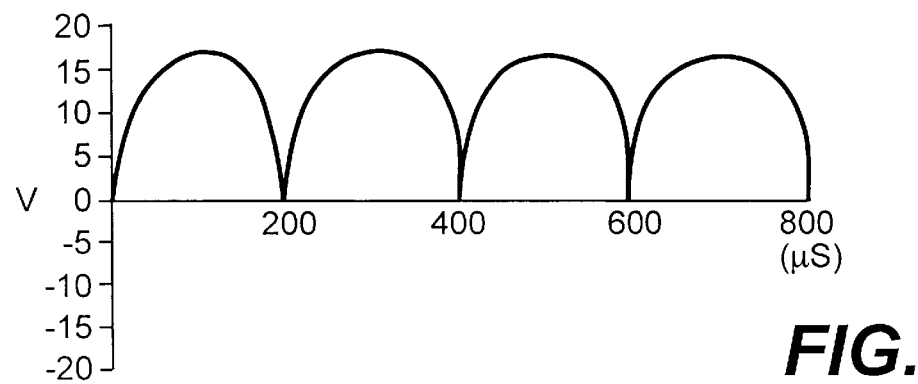
FIG. 6C is a graphical representation of a rectified voltage output signal of two coil sets of an electric current generation device constructed in accordance with the present invention.

FIGS. 6A, 6B, and 6C illustrate voltage signal responses of each coil set and the resulting output of diodes 40 (FIG. 1). FIG. 6A is an approximate illustration of the unrectified voltage response of one coil set at a given engine speed, for example approximately 2000 rpm's. FIG. 6B approximately illustrates the unrectified voltage response of the other coil set at the same instant. It should be understood, however, that the actual voltage responses will deviate from these curves due to real world conditions.

Figure 12:
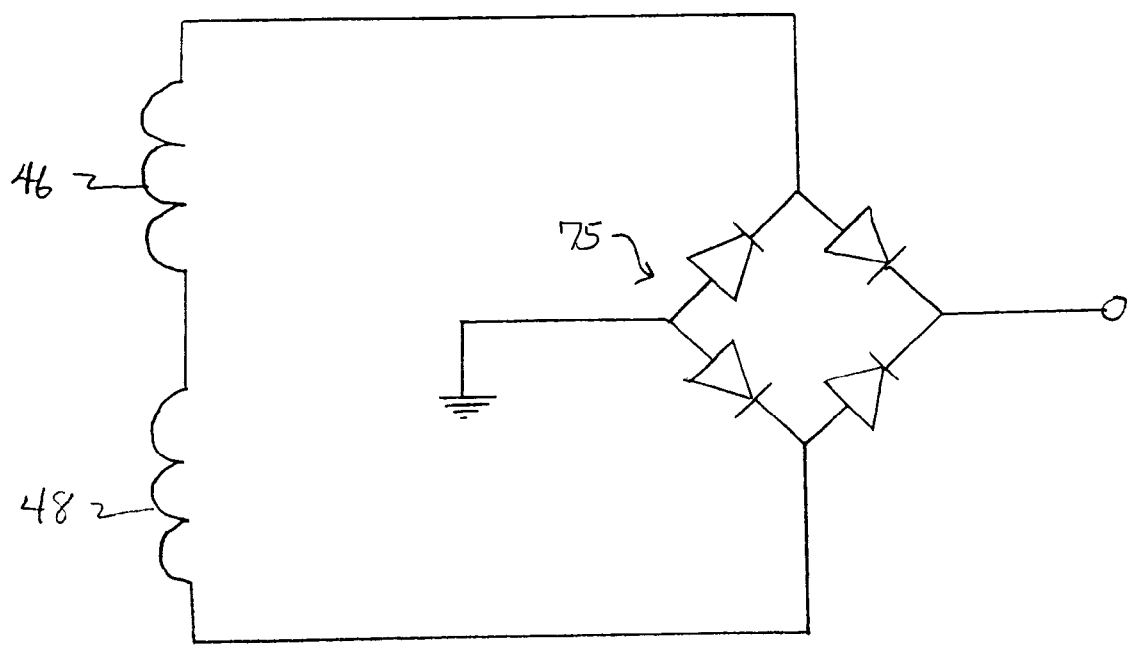
FIG. 12 is an electric diagrammatic representation of a stator of an electric current generation device constructed in accordance with the present invention.

Because diodes 40 half-wave rectify the output of each coil set, the total stator output is a full-wave rectified signal, as illustrated in FIG. 6C. Thus, the use of a pair of half-wave rectified coil sets provides a full-wave rectified output without the use of a full-wave rectifier. It should be understood, however, that a full-wave rectifier mechanism, for example comprising four diodes constructed in the well-understood manner, could be used to produce an output similar to that shown in FIG. 6C from the output of a single coil set. For example, FIG. 12 illustrates a diode bridge circuit 75 connected across a first coil group 46 and a second coil group 48.

Figure 7:
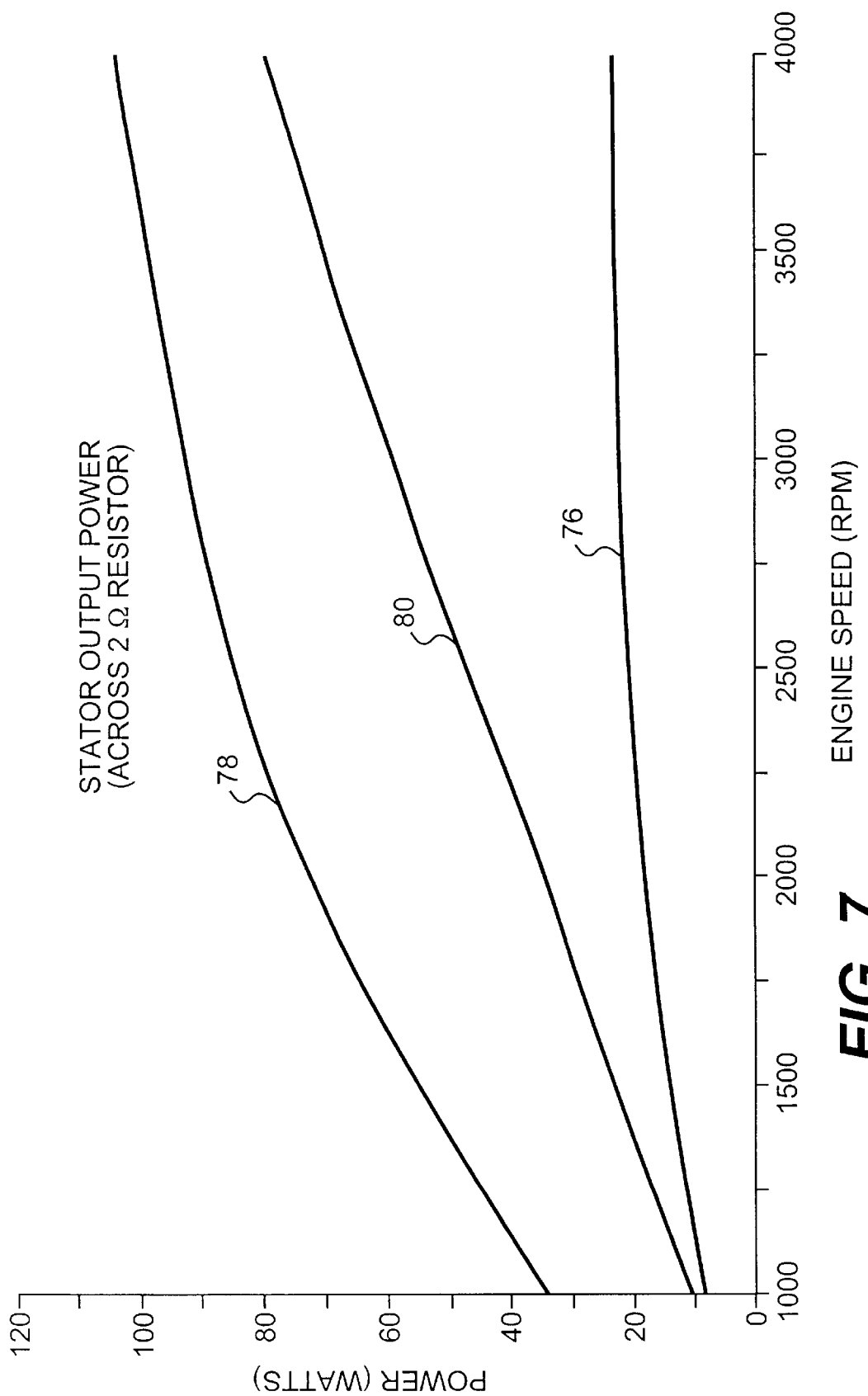
FIG. 7 is a graphical representation of power output of an electric current generation device constructed in accordance with the present invention compared to reference power outputs.
Figure 8:
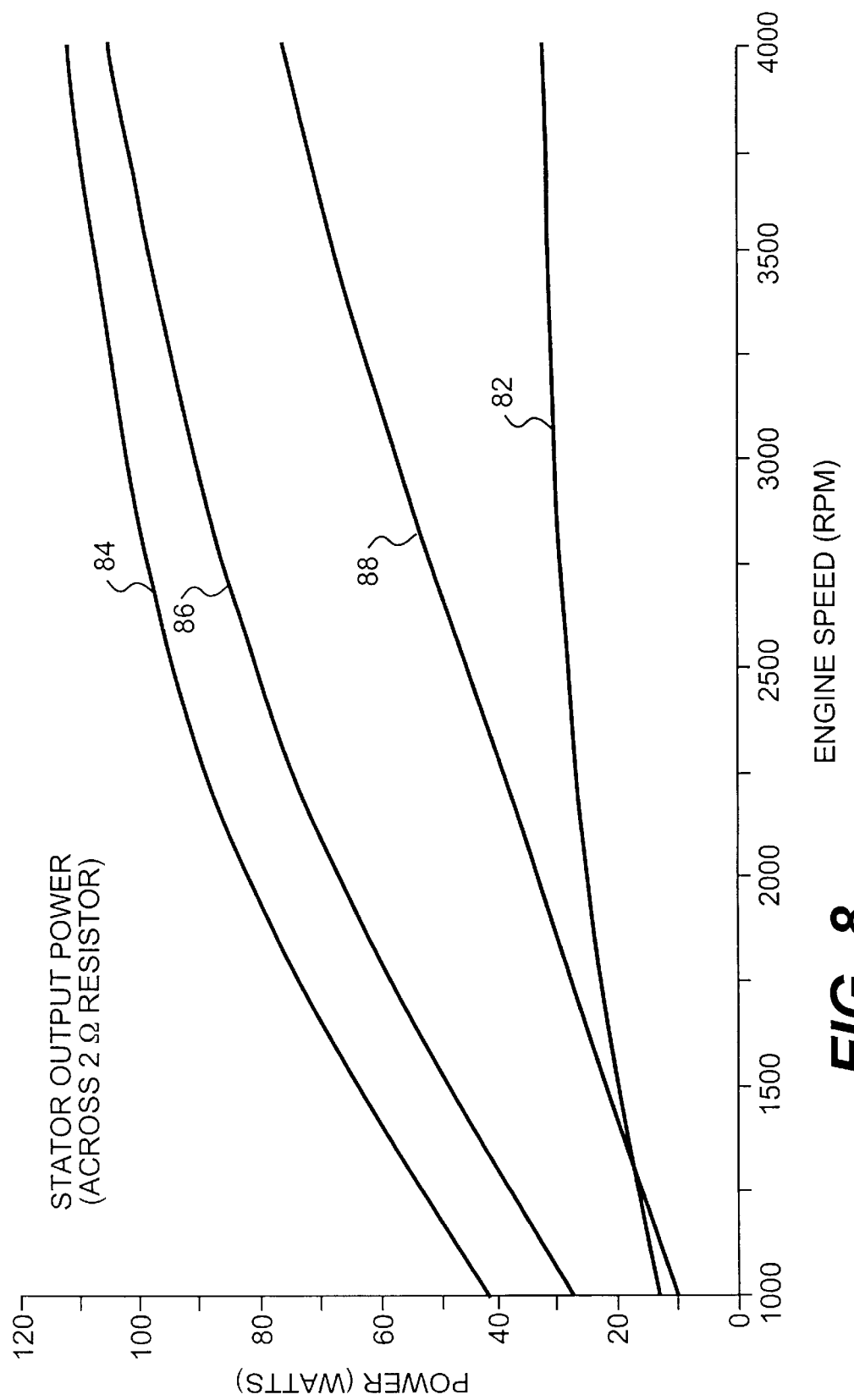
FIG. 8 is a graphical representation of power output of an electric current generation device constructed in accordance with the present invention compared to reference power outputs.

Referring now to FIG. 7, line 76 illustrates the output power of one coil set comprised of five forward and two reverse-wound coils (shorted across a 2 ohm resistor) as a function of engine speed. Line 78 illustrates the output power of five forward wound coils alone, while line 80 illustrates the output power of two forward wound poles alone. As can be seen from FIG. 7, the winding arrangement of the present invention provides significantly improved current regulation. Similarly, FIG. 8 illustrates power output 82 of a coil set having six forward wound coils and two reverse wound coils, as compared to power output 84, 86, and 88 of six, four, and two forward wound coils respectively.

With the coil winding configuration shown, for example, in FIG. 1, the total voltage across a coil set is less than the aggregate voltage across the forward wound coils, and the total impedance of the coil set is greater than the total impedance of the forward wound coils.

First, the reverse wound coils cause a straight subtractive reduction of the voltage across the forward wound coils. For example, line 54 of FIG. 3 is approximately equal to the difference between lines 56 and 58. Thus, with respect to voltage, the reverse wound coils cause a simple subtraction, and the coil set behaves as if it were comprised of only three forward wound coils.

Second, in general, the total impedance of the coil set increases as coils are added. Also, the current in the coil set is decreased by an increased coil set impedance and is increased by increased coil set voltage. Referring to lines 62 and 66 of FIG. 4, the positive effect of the greater voltage across the five windings relative to the two windings overcomes the negative effect of the greater relative impedance, and the current output of the five windings is greater than that of the two windings. Similarly, the current output of three forward windings is between lines 62 and 66.

Finally, the interaction of multiple coils affects current increase at high rotor speeds. Although current through an ideal inductor may increase indefinitely, in reality current will be limited. Specifically, as rotor speed increases, current output from the coils increases up to a maximum value, at which point the coils may be considered saturated, and then begins to drop. Although none of lines 62, 64, 66 and 60 of FIG. 4 extend to a maximum value, the reduction in the rate of current increase prior to reaching the maximum current is illustrated. As rotor speed increases from 1000 rpm's, the four output currents increase at a relatively high rate. As rotor speed continues to increase, however, the rate of current increase tends to drop.

The effect is most dramatic in line 60. From the beginning, the slope of line 60 is less than that of lines 62, 64 and 66. The slope drops significantly, however, between approximately 1750 and 2250 rpm's and approaches zero before 3000 rpm's. The slopes of lines 62, 64 and 66 are approximately the same from 1000 rpm's to about 2000 rpm's, approximately at which point the slope of line 62 begins to significantly drop. Lines 64 and 66 do not flatten to the degree of line 62 within the engine speed range illustrated in FIG. 4. Although the current increase of lines 64 and 66 is much lower at the higher speeds than at lower speeds, current is still noticeably increasing at 4000 rpm's. Line 66 is the least affected within the figure's engine speed range.

A change in a coil set's total impedance has a greater affect on stator current at high engine speeds than at low engine speeds. Thus, if the voltage across two coil sets is the same throughout the engine speed range, the coil set having the higher impedance will have the lower current maximum. It will also have a lower current output at lower engine speeds, but the difference is less. Therefore, the output current of the higher impedance coil set increases more slowly as engine speed increases.

This is illustrated in FIG. 4 by lines 64 and 60, which, as described above, represent current output for coil sets having approximately the same voltage response. The output current of the coil set of line 60, which has the greater impedance, varies between about 2.2 amps and about 3.4 amps. The output current of the coil set of line 64 varies between about 3 amps and about 6.6 amps.

As long as the current output is high enough to operatively drive the device to which the stator is connected, for example an electric clutch on a commercial lawn mower, the current response of line 60 is preferable to that of line 64 since there is less risk of damage to the device from excessive current at higher rpm's.

As illustrated in FIG. 4, increasing the number of coils increases impedance. Thus, line 62, which represents the current output of the set of five forward wound coils, runs through a smaller current range than does either of lines 64 or 66, which represent the output of coil sets having three and two forward wound coils, respectively. The resulting voltage increase caused by the additional coils, however, overcomes the impedance increase so that the output current level may be undesirable.

Figure 9:
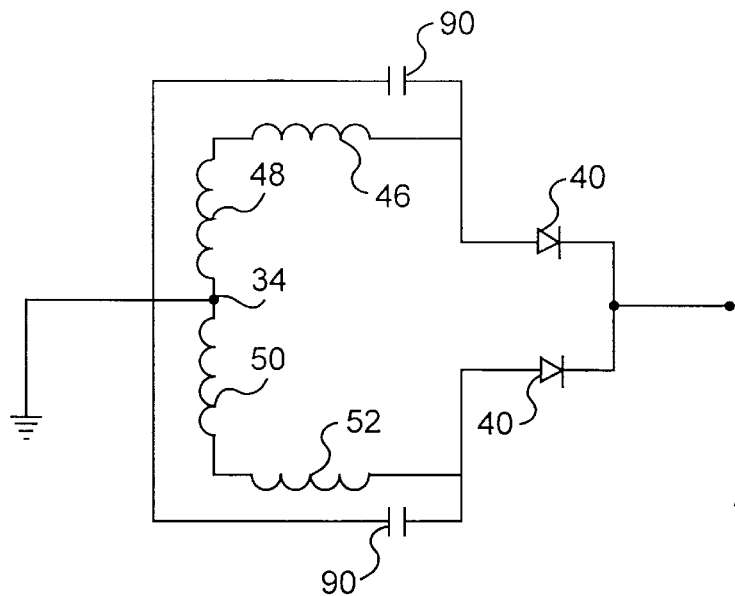
FIG. 9 is an electric diagrammatic representation of a stator of an electric current generation device constructed in accordance with the present invention.
Figure 10:
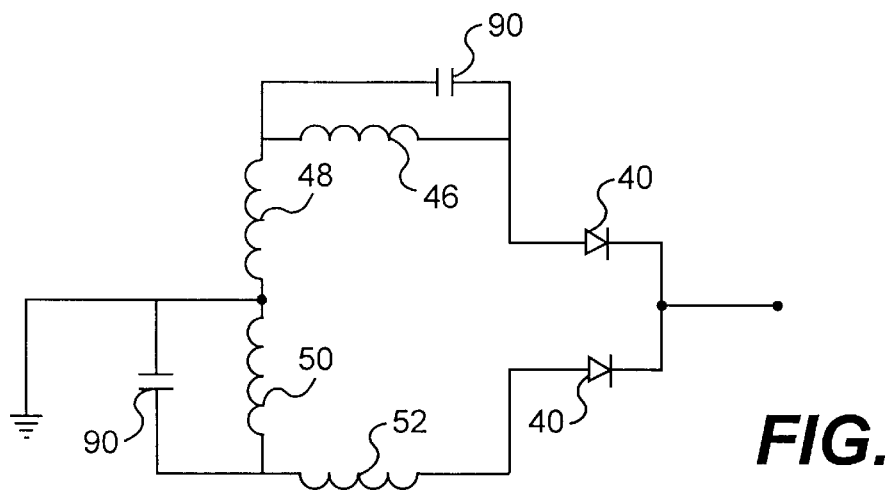
FIG. 10 is an electric diagrammatic representation of a stator of an electric current generation device constructed in accordance with the present invention.
Figure 11:
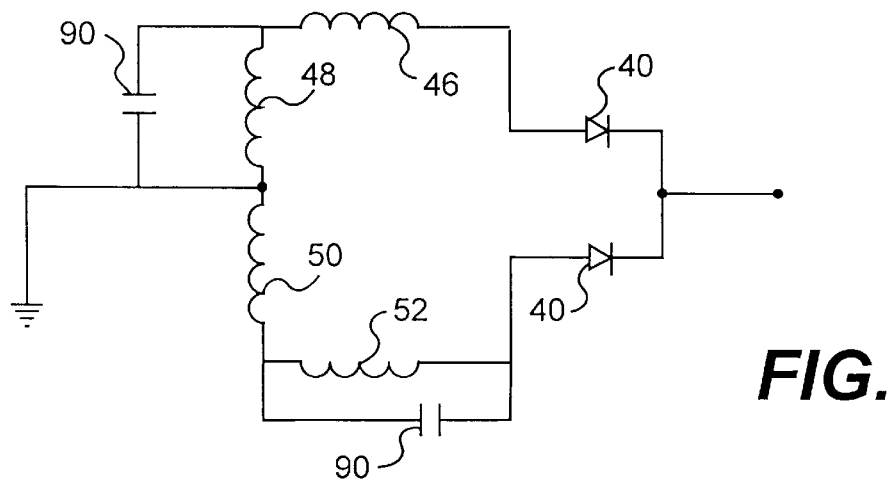
FIG. 11 is an electric diagrammatic representation of a stator of an electric current generation device constructed in accordance with the present invention.

Various suitable modifications may be employed with the circuitry described above within the scope of the present invention. Referring to FIG. 9, for example, each coil set includes a capacitor 90 connected across each coil set to boost output at a certain frequency, depending on the capacitor value. Thus, the capacitors may be used to increase output where needed to further flatten the output. Other arrangements are possible. For example, in FIG. 10 the capacitors are connected across the forward wound coils, whereas in FIG. 11 they are connected across the reverse wound coils. Additionally, or alternatively, a capacitor may be connected across one or more individual coil groups 46, 48, 50 and 52 in various combinations. In a still further arrangement, a capacitor may be connected across all, or a combination of some, of the coils shown in FIG. 1.

While preferred embodiments of the invention have been described above, it should be understood that any and all equivalent realizations of the present invention are included within the scope and spirit thereof. For example, a stator may include two coil sets wherein the output of each is full-wave rectified and added to the output of the other. In another embodiment, the stator may include two coil sets wound so that they are electrically in phase with each other. The outputs may then be added and rectified by a single full-wave rectifier. In yet another embodiment, the stator may include a single half-wave rectified coil set and a capacitor to improve the output. Still further, the stator may include a single full-wave rectified coil set or more than two independently half-wave rectified coil sets. Thus, the embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. An electric current generation device, said device comprising:

a rotatable rotor including a plurality of magnets arranged in an equiangularly spaced relationship and in alternating polarity so that said magnets establish a magnetic field proximate said rotor; and a stator including at least two sets of coils electrically in parallel with each other and disposed with respect to said rotor so that rotation of said rotor moves said magnetic field with respect to the coils of said coil sets to generate electric current flow in said coil sets, wherein at least one said coil in each said coil set is disposed with respect to said magnetic field so that it is electrically out of phase with other said coils in said coil set.

2. The device as in claim 1, wherein, in each said coil set, said at least one coil is 180° out of phase with said other coils.

3. The device as in claim 1, including a capacitor operatively disposed across a coil of said coil set.

4. The device as in claim 3, wherein said capacitor is disposed across a plurality of said coils.

5. The device as in claim 1, wherein, in each said coil set, the winding direction of said at least one coil with respect to said magnetic field is opposite the winding direction of said other coils with respect to said magnetic field.

6. The device as in claim 5, wherein said other coils are wound in alternating opposite directions with respect to each other so that said other coils are electrically in phase with each other, and wherein said at least one coil is wound oppositely to said other coils with respect to said magnetic field so that said at least one coil is electrically out of phase with respect to said other coils.

7. The device as in claim 6, wherein said magnets are discrete with respect to each other.

8. The device as in claim 6, including more than one said at least one coil.

9. The device as in claim 6, wherein said other coils are disposed adjacent to each other and said at least one coil is disposed adjacent said other coils.

10. The device as in claim 6, wherein said coils of each said coil set are electrically connected in series.

11. The device as in claim 6, wherein said rotor includes an inner annular surface about which said magnets are arranged in alternating polarity, wherein said stator includes an annular member concentric with said inner annular surface of said rotor, and wherein said coils of said coil set are electrically connected in series and are disposed on said annular member so that said coils extend into said magnetic field.

12. An electric current generation device, said device comprising:
    a rotatable rotor including a magnet assembly establishing a magnetic field proximate said rotor; and
    a stator including a plurality of poles extending into said magnetic field and a set of coils electrically connected in series, each coil of said coil set being wound about a respective said pole so that rotation of said rotor moves said magnetic field with respect to said coil set to generate electric current flow in said coil set,
    wherein the winding direction of at least one said coil with respect to said magnetic field is opposite the winding direction of the other said coils with respect to said magnetic field, and wherein one end of said coil set is electrically grounded through said stator.

13. An electric current generation device, said device comprising:
    a rotatable rotor including a plurality of magnets arranged in alternating polarity so that said magnets establish a magnetic field proximate said rotor; and
    a stator including a plurality of poles extending into said magnetic field and two sets of coils electrically in parallel with each other, wherein the coils of each said coil set are electrically connected in series, each coil of each said coil set being wound about a respective said pole so that rotation of said rotor moves said magnetic field with respect to said coil set to generate electric current flow in said coil set,
    wherein, in each said coil set, the winding direction of at least one said coil with respect to said magnetic field is opposite the winding direction of the other said coils with respect to said magnetic field and wherein there are unequal numbers of said at least one coil and said other coils.

14. The device as in claim 13, wherein each said coil set includes more than one said at least one coil.

15. The device as in claim 13, wherein, in each said coil set, said other coils are disposed adjacent to each other and said at least one coil is disposed adjacent said other coils.

16. The device as in claim 15, including, in each said coil set, five said other coils and two said at least one coils.

17. The device as in claim 15, including, in each said coil set, six said other coils and two said at least one coils.

18. An electric current generation device, said device comprising:
    a rotatable rotor having an inner annular surface and including a plurality of magnets arranged in alternating polarity about said inner annular surface to establish a magnetic field proximate said inner annular surface; and
    a stator having an annular outer surface concentric with and opposing said inner annular surface of said rotor and including a plurality of poles extending from said annular outer surface toward said inner annular surface of said rotor into said magnetic field and two sets of coils electrically in parallel with each other, wherein the coils of each said coil set are electrically connected in series, each coil of each said coil set being wound about a respective said pole so that rotation of said rotor moves said magnetic field with respect to said coil set to generate electric current flow in said coil set,
    wherein, in each said coil set, a plurality of said coils comprising a first group of said coil set are wound in alternating opposite directions with respect to each other so that said coils of said first group are electrically in phase with each other, and wherein at least one said coil comprising a second group of said coils of said coil set is wound in an opposite direction to said first group with respect to said magnetic field so that said second group is electrically out of phase with said first group.

19. The device as in claim 18, wherein said second group includes a plurality of coils.

20. The device as in claim 18, wherein said coils in said first group are disposed adjacent to each other and said second group is disposed adjacent said first group.

21. An electric current generation device, said device comprising:
    a rotatable rotor including a magnet assembly establishing a magnetic field proximate said rotor;
    a stator including at least two sets of coils disposed with respect to said rotor so that rotation of said rotor moves said magnetic field with respect to the coils of said coil sets to generate electric current flow in said coil sets,
    wherein the coils of a first said coil set are wound so that the output of said first coil set is out of phase with respect to the output of a second said coil set; and
    a rectifier mechanism in operative communication with said first coil set and said second coil set, said rectifier mechanism configured to rectify and combine the output of said first coil set and the output of said second coil set,
    wherein said coils of said first coil set are electrically connected in series, wherein said coils of said second coil set are electrically connected in series, and wherein one end of each of said first and said second coil set is electrically grounded and the other end of each of said first and second coil set is connected to said rectifier mechanism.

22. The device as in claim 21, wherein said rectifier mechanism includes a pair of diodes, an upstream end of each said diode being electrically connected to said other end of a respective one of said first coil set and said second coil set and the downstream ends of said diodes being electrically connected to each other.

23. The device as in claim 21, wherein said grounded end of each of said first coil set and said second coil set is connected to an internal ground.

24. An electric current generation device, said device comprising:
   a rotatable rotor including a plurality of magnets arranged in alternating polarity so that said magnets establish a magnetic field proximate said rotor;
   a stator including two sets of coils disposed with respect to said rotor so that rotation of said rotor moves said magnetic field with respect to the coils of said coil sets to generate electric current flow in said coil sets,
   wherein the coils of a first said coil set are wound so that the output of said first coil set is 180° out of phase with respect to the output of a second said coil set; and
   a rectifier mechanism in operative communication with said first coil set and said second coil set, said rectifier mechanism configured to rectify and combine the output of said first coil set and the output of said second coil set.

25. The device as in claim 24, wherein said rectifier mechanism is configured to half-wave rectify said output of said first coil set and said output of said second coil set.

26. The device as in claim 24, wherein the winding direction of said coils of said first coil set with respect to said magnetic field is opposite to the winding direction of said coils of said second coil set with respect to said magnetic field.

27. The device as in claim 24, wherein, in each of said first coil set and said second coil set, at least one said coil of said coil set is disposed with respect to the other said coils of said coil set to limit electric current flow from said other coils.

28. The device as in claim 27, wherein, in each of said first coil set and said second coil set, said at least one coil is configured with respect to said other coils so that the voltage across said coil set when said rotor rotates is less than the aggregate voltage across said other coils and so that the total impedance of the respective said coil set when said rotor rotates is greater than the total impedance of said other coils.

29. The device as in claim 27, wherein each of said first coil set and said second coil set includes more than one said at least one coil.

30. The device as in claim 27, wherein, in each of said first coil set and said second coil set, the winding direction of said at least one coil with respect to said magnetic field is opposite the winding direction of said other coils with respect to said magnetic field.

31. The device as in claim 30, wherein
   said rotor includes a plurality of magnets arranged in a spaced apart relationship and in alternating polarity to establish said magnetic field, and
   in each of said first coil set and said second coil set,
      said other coils are wound in alternating opposite directions with respect to each other so that said other coils are electrically in phase with each other, and
      said at least one coil is wound oppositely to said other coils with respect to said magnetic field so that said at least one coil is electrically out of phase with respect to said other coils.

32. The device as in claim 31, wherein, in each of said first coil set and said second coil set, said other coils are disposed adjacent to each other and said at least one coil is disposed adjacent said other coils.

33. An electric current generation device, said device comprising:
   a rotatable rotor including a plurality of magnets arranged in alternating polarity so that said magnets establish a magnetic field proximate said rotor;
   a stator including a plurality of poles extending into said magnetic field and at least two sets of coils, wherein
      the coils in each said coil set are electrically connected in series,
      each coil of said coil sets is wound about a respective said pole so that rotation of said rotor moves said magnetic field with respect to said coil sets to generate electric current flow in said coil sets, and
      the coils of a first said coil set are wound so that the output of said first coil set is approximately 180° out of phase with respect to the output of a second said coil set; and
   a rectifier mechanism in operative communication with said first coil set and said second coil set, said rectifier mechanism configured to half-wave rectify and combine the output of said first coil set and the output of said second coil set.

34. The device as in claim 33, wherein the winding direction of said coils of said first coil set with respect to said magnetic field is opposite to the winding direction of said coils of said second coil set with respect to said magnetic field.

35. An electric current generation device, said device comprising:
   a rotatable rotor having an inner annular surface and including a plurality of magnets arranged in alternating polarity about said inner annular surface to establish a magnetic field proximate said inner annular surface;
   a stator having an outer annular surface concentric with and opposing said inner annular surface of said rotor and including a plurality of poles extending from said annular outer surface toward said inner annular surface of said rotor into said magnetic field and at least two sets of coils, wherein
      the coils in each said coil set are electrically connected in series,
      each coil of said coil sets is wound about a respective said pole so that rotation of said rotor moves said magnetic field with respect to said coil sets to generate electric current flow in said coil sets,
      the winding direction of coils of a first said coil set with respect to said magnetic field is opposite to the winding direction of coils of a second said coil set with respect to said magnetic field, and
      in each of said first coil set and said second coil set,
         the winding direction of at least one said coil of said coil set with respect to said magnetic field is opposite the winding direction of the other said coils of said coil set with respect to said magnetic field,
         said other coils are wound in alternating opposite directions with respect to each other so that said other coils are electrically in phase with each other,
         there are unequal numbers of said at least one coil and said other coils, and said at least one coil is wound oppositely to said other coils with respect to said magnetic field so that said at least one coil is electrically out of phase with respect to said other coils; and a rectifier mechanism in operative communication with said first coil set and said second coil set, said rectifier mechanism configured to half-wave rectify and combine the output of said first coil set and the output of said second coil set.

36. The device as in claim 35, wherein each of said first coil set and said second coil set includes five said other coils and two said at least one coils.

37. The device as in claim 35, wherein each of said first coil set and said second coil set includes six said other coils and two said at least one coils.

38. An electric current generation device, said device comprising:

a rotatable rotor having an inner annular surface and including a plurality of magnets arranged in a spaced apart relationship and in alternating polarity about said inner annular surface to establish a magnetic field proximate said inner annular surface;

a stator having an annular outer surface concentric with and opposing said inner annular surface of said rotor and including a plurality of poles extending from said annular outer surface toward said inner annular surface of said rotor into said magnetic field and two sets of coils electrically in parallel with each other, wherein the coils of each said coil set are electrically connected in series, each coil of each said coil set being wound about a respective said pole so that rotation of said rotor moves said magnetic field with respect to said coil set to generate electric current flow in said coil set, wherein, in each said coil set, a plurality of said coils comprising a first group of said coil set are wound in alternating opposite directions with respect to each other so that said coils of said first group are electrically in phase with each other, and wherein at least one said coil comprising a second group of said coils of said coil set is wound in an opposite direction to said first group with respect to said magnetic field so that said second group is electrically out of phase with said first group; and a full-wave rectifier mechanism in operative communication with said coil sets and configured to full-wave rectify the output of said coil sets.

39. The device as in claim 38, wherein said rectifier mechanism includes two full-wave rectifiers respectively in operative communication with said coil sets.

40. The device as in claim 38, wherein said full wave rectifier mechanism includes a diode bridge circuit.

* * * * *